United States Patent [19]
Carlton et al.

[11] Patent Number: 5,529,190
[45] Date of Patent: Jun. 25, 1996

[54] GAS SPARGED HYDROCYCLONE WITH FOAM SEPARATING VESSEL

[75] Inventors: Keith A. Carlton, Glens Falls, N.Y.;
Mahendra R. Doshi, Appleton, Wis.;
Todd A. Salvato, Columbus, Ind.;
Erwin D. Funk; Joseph R. Phillips, both of Queensbury, N.Y.; Scott M. Clum, Columbus, Ind.

[73] Assignee: Ahlstrom Machinery, Inc., Glens Falls, N.Y.

[21] Appl. No.: 384,795

[22] Filed: Feb. 6, 1995

[51] Int. Cl.⁶ ............................ B03D 1/24; B04C 9/00; B04C 5/00
[52] U.S. Cl. .................... 209/170.000; 209/727; 209/730; 209/733; 210/221.2; 162/4
[58] Field of Search .......................... 209/170, 727, 209/728, 729, 730, 731, 733; 210/221.1, 221.2, 703; 162/4

[56] References Cited

U.S. PATENT DOCUMENTS

| | | |
|---|---|---|
| 3,865,719 | 2/1975 | Holik et al. . |
| 4,157,952 | 6/1979 | Krofta . |
| 4,186,094 | 1/1980 | Hellberg . |
| 4,214,982 | 7/1980 | Pfalzer . |
| 4,255,262 | 3/1981 | O'Cheskey et al. . |
| 4,328,095 | 5/1982 | Ortner et al. . |
| 4,347,128 | 8/1982 | Barnscheidt . |
| 4,368,101 | 1/1983 | Bahr et al. . |
| 4,399,028 | 8/1983 | Kile et al. . |
| 4,477,341 | 10/1984 | Schweiss et al. . |
| 4,512,888 | 4/1985 | Flynn . |
| 4,548,673 | 10/1985 | Nanda et al. . |
| 4,560,474 | 12/1985 | Holik . |
| 4,721,562 | 1/1988 | Barnscheidt et al. . |
| 4,722,784 | 2/1988 | Barnscheidt . |
| 4,726,897 | 2/1988 | Schweiss et al. . |

(List continued on next page.)

FOREIGN PATENT DOCUMENTS

| | | |
|---|---|---|
| 198737 | 1/1986 | European Pat. Off. . |
| 261968 | 3/1988 | European Pat. Off. . |
| 271427 | 6/1988 | European Pat. Off. . |
| 342857 | 11/1989 | European Pat. Off. . |
| 477162 | 3/1992 | European Pat. Off. . |
| 618012 | 10/1994 | European Pat. Off. . |
| 3120202 | 12/1982 | Germany . |
| 3634903 | 4/1988 | Germany . |
| 937437 | 1/1980 | U.S.S.R. . |
| 694918 | 7/1953 | United Kingdom . |

OTHER PUBLICATIONS

Fiberprep Advertisement "Verticel™. . . the high-yield investment in deinking technology", 1991.
Ebert, "Japanese Technology Do We Really Kneed It?", presented at TAPPI-AICHE meeting, San Diego, Nov. 10, 1994.

*Primary Examiner*—Thomas M. Lithgow
*Attorney, Agent, or Firm*—Nixon & Vanderhye

[57] ABSTRACT

A slurry of recycled cellulose fibers is deinked by introducing the slurry into the first end of a vortex, sparging gas radially inwardly into the slurry to cause gas bubbles to attach to contaminants and ink particles to form an aerated slurry, discharging the aerated slurry from near the second end of the vortex into a separation vessel, effecting separation of a foam of ink laden gas bubbles from the cellulose fiber slurry in the separation vessel, and removing from the separation vessel the foam with associated ink and contaminants in a first stream, and de-inked cellulose fiber slurry in a second stream. The separation vessel is typically a foam separating vessel with separation effected by flotation, and by discharging the foam. The slurry is introduced into the flotation vessel below the liquid level in it. The slurry typically has a consistency of about 0.5–2%, and the gas to slurry volume ratio during sparging may be 0.1–1 to 1.0 (e.g. 0.2–0.7 to 1, or 0.3–0.4 to 1). The foam separating vessel may be cylindrical with a shower head at the top, and rejects therefrom directed to a rejects tank. Sparging takes place in a hydrocyclone with an outlet that may or may not be restricted; a rejects outlet may extend from a first end of the hydrocyclone to a rejects tank.

20 Claims, 3 Drawing Sheets

U.S. PATENT DOCUMENTS

| | | |
|---|---|---|
| 4,749,473 | 6/1988 | Shioiri . |
| 4,938,865 | 7/1990 | Jameson . |
| 4,952,308 | 8/1990 | Chamberlin . |
| 4,971,731 | 11/1990 | Zipperian . |
| 5,022,984 | 6/1991 | Pimley et al. . |
| 5,028,315 | 7/1991 | Crnea . |
| 5,049,320 | 9/1991 | Wang . |
| 5,064,531 | 11/1991 | Wang . |
| 5,068,031 | 11/1991 | Wang . |
| 5,069,751 | 12/1991 | Chamblee et al. . |
| 5,069,783 | 12/1991 | Wang . |
| 5,078,921 | 11/1992 | Zipperian . |
| 5,116,488 | 5/1992 | Torregrossa . |
| 5,131,980 | 7/1992 | Chamblee et al. . |
| 5,167,798 | 12/1992 | Yoon et al. . |
| 5,173,177 | 12/1992 | Greenwood et al. . |
| 5,242,585 | 9/1993 | Krofta . |
| 5,279,424 | 1/1994 | Britz et al. . |

GAS SPARGED HYDROCYCLONE WITH FOAM SEPARATING VESSEL

BACKGROUND AND SUMMARY OF THE INVENTION

In the production of paper products from recycled paper, ink removal (de-inking) is critical if the brightness and cleanliness of the resulting product is to meet the standards of the end user. The most common way to effect de-inking is by flotation in which a slurry of ink laden recycled pulp is exposed to a source of minute air bubbles. The hydrophobic ink particles tend to adhere to the air bubbles and rise to the surface of the slurry and form a froth. The ink laden froth is removed leaving a recycled de-inked fiber that can be used to produce recycled paper.

One typical way of de-inking is the use of gas sparged hydrocyclones such as shown in U.S. Pat. Nos. 5,069,751, 5,173,177 and 5,131,980, the disclosures of which are hereby incorporated by reference herein. In these systems pressurized air passes radially through a porous cylinder and contacts the swirling slurry. Air bubbles collide with and attach to the ink particles in the liquid slurry and pass through the slurry and float in the form of a column to the top of the cyclone where they are removed. The slurry, with ink removed, continues down the cyclone and passes out of the base of the unit. At the base, an orifice, restriction, or "pedestal" is provided which provides a support for the foam column and a restriction to slurry flow. The amount of flow out of the rejects outlet is controlled by, among other things, adjustment of this restriction. Such hydrocyclones (such as sold commercially by Kamyr, Inc. of Glens Falls, N.Y. under the trademark "GSC®") function as a de-inker per se. While such devices provide an effective means for removing contaminants from pulp slurries, the present invention provides an improved method and apparatus for removing contaminants while utilizing such a hydrocyclone.

According to the present invention a method and apparatus are provided which utilizes the unique performance of the above hydrocyclone in cooperation with other equipment to provide an improved method of removing contaminants, e.g. ink particles, from recycled pulp slurries. According to the present invention hydrocyclones, such as described above, are operated to function as a "contactor" rather than a de-inker per se, though de-inking may also occur. With such hydrocyclone contactors connected to a flotation (or other type of separation) vessel an improved de-inking apparatus is provided. One advantage of this hydrocyclone contactor compared to conventional de-inking systems is that it can handle large increases in air flow without disrupting the downstream operations. With large air volume increases, any air that does not attach to the contaminants simply passes through the slurry vortex and is discharged through the rejects outlet at the top of the hydrocyclone. Thus large volumes of air can be introduced into the contactor and contaminant contact or removal increased without adversely affecting the operation of the system. This is particularly effective in treating heavily ink or contaminant laden slurries.

The hydrocyclones that are utilized according to the present invention are substantially identical to the conventional GSC® hydrocyclones (and those shown in U.S. Pat. Nos. 5,069,751 and 5,131,980) except the restriction at the outlet of the hydrocyclone is eliminated, or at least has a different function. Where in conventional GSC® hydrocyclones the role of the restriction, or pedestal, was to support the foam column, the restriction in the contacting hydrocyclone, if present, functions to regulate reject flow out the top of the unit.

According to the present invention the hydrocyclone is tolerant of (and sensitive to) gross changes in air flow. However the actual air flow to the hydrocyclones according to the invention is less than in the conventional hydrocyclones as described above. For example the air flows to the hydrocyclone according to the invention are approximately two-thirds less than the air flow to a conventional, de-inking GSC® hydrocyclone.

According to a first aspect of the present invention a method of de-inking a slurry of recycled cellulose fibers is provided which comprises the following steps: (a) Introducing an ink-laden slurry of recycled cellulose fibers into the first end of a vortex having first and second opposite ends. (b) Sparging gas radially inwardly into the slurry to cause gas bubbles to attach to contaminants and ink particles to form an aerated slurry. (c) Discharging a substantial portion of the aerated slurry from adjacent the second end of the vortex, and into a separation vessel. (d) Effecting separation of a foam of ink and contaminant-laden gas bubbles from the cellulose fiber slurry in the separation vessel. And, (e) removing from the separation vessel the foam with associated ink and contaminants in a first stream, and de-inked cellulose fiber slurry in a second stream.

Typically the separation vessel is a foam separation vessel and steps (d) and (e) are practiced by flotation. The flotation vessel typically has a liquid level, and step (c) is practiced to introduce the slurry below the liquid level in the flotation vessel. There is also then the further step of controlling the rate of flow out of the vortex by varying the liquid level in the flotation vessel, which is particularly effective in diverting extremely dirty furnish out of the rejects outlet by raising the level in the flotation column.

Steps (a) through (c) are typically practiced with the slurry having a consistency of about 0.5–2.0% solids (optimum normally about 1%), and step (b) is practiced with a gas to slurry volume ratio of about 0.1 to 1.0 to 1, preferably 0.2 to 0.7 to 1, typically, 0.3 to 0.4 to 1. The vortex (defined by a hydrocyclone) typically has a rejects flow from the first end thereof, and there is the further step of controlling the flow of rejects from the first end of the vortex so that it is about 0–20% (typically about 8–12% when rejects are withdrawn) of the liquid volume of slurry flowing through the vortex.

The flotation vessel may have a curved bottom and an accepts outlet in the curved bottom and a liquid surface. In this situation step (c) is typically practiced so as to introduce slurry into the flotation vessel in a direction away from the accepts outlet so that the slurry flows in part along the curved bottom and up toward the surface of liquid in the flotation vessel before passing to the accepts outlet (which may be covered in part by a baffle plate).

According to another aspect of the present invention a de-inking system is provided comprising the following components: A gas sparged hydrocyclone having first and second ends, a slurry inlet adjacent the first end, and a slurry outlet adjacent the second end. A flotation vessel having a liquid level therein, a top, and a bottom. A conduit connecting the slurry outlet to the flotation vessel and having a discharge opening below the liquid level in the flotation vessel. A slurry accepts outlet from the flotation vessel bottom.

This system may also include a means for removing foam at the liquid level, with ink particles and contaminants therein, from the flotation vessel. This foam removing means may comprise a wide variety of individual components or combination of components. For example the foam removing means may include a rotating mechanical element, which may rotate about either a horizontal or vertical axis and may have blades, paddles, or like elements with a wide variety of shapes.

The flotation vessel bottom may be curved and the slurry accepts outlet disposed in the curved bottom, and covered in part by a baffle plate. The conduit may include a header having openings therein, with the openings directed away from the slurry accepts outlet. Alternatively the flotation vessel may be tapered so that it has a larger cross-sectional area at the top than at the bottom, and the bottom may be flat.

The hydrocyclone may include a rejects outlet adjacent the first end thereof, and the system may further comprise a rejects tank operatively connected to the foam removing means with a second conduit extending from the hydrocyclone rejects outlet to the rejects tank. The hydrocyclone has an open, substantially unrestricted second end in open communication with the conduit so that it acts as a contactor rather than a de-inker per se, in the preferred embodiment, although a restriction may be provided instead and the system operated so that only a relatively small amount of rejects are withdrawn through the hydrocyclone rejects outlet.

It is the primary object of the present invention to provide an effective method and apparatus for high efficiency de-inking of recycled cellulose fiber slurries, to produce high quality recycled paper products. This and other objects of invention will become clear from an inspection of the detailed description of the invention, and from the appended claims.

DETAILED DESCRIPTION OF THE DRAWINGS

Figure 2:
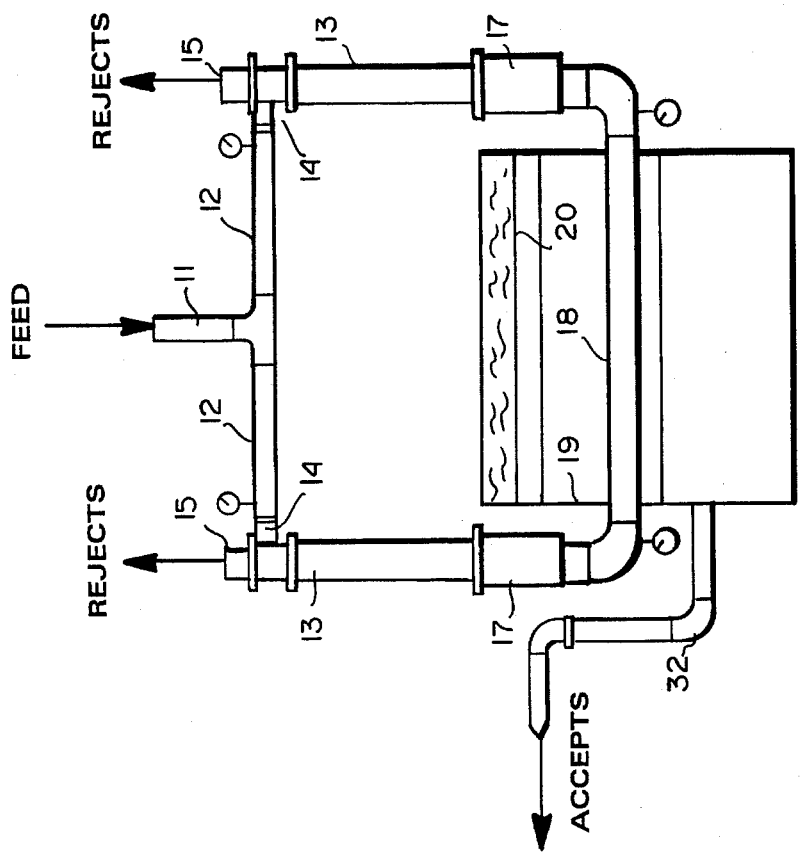
FIG. 2 is a view partly in cross-section and partly in elevation taken along lines 2—2 of FIG. 1.
Figure 1:
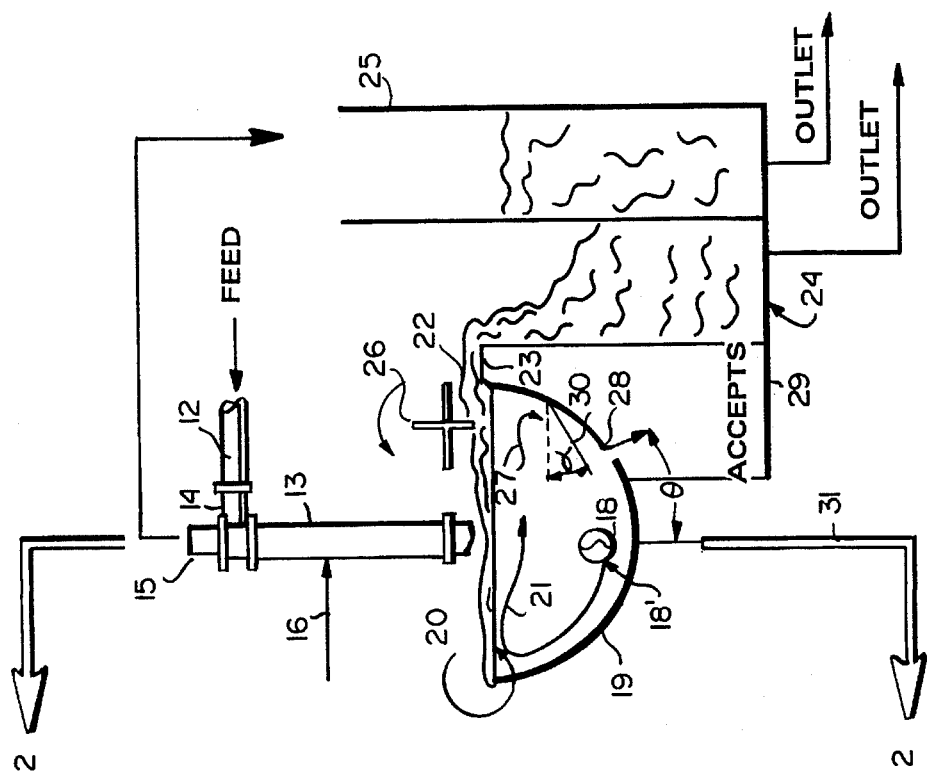
FIG. 1 is a side schematic view of a first exemplary embodiment of a de-inking system according to the present invention for practicing the method of de-inking a slurry of recycled cellulose fibers according to the invention.

FIGS. 1 and 2 illustrate one embodiment of a de-inking system according to the invention which includes the discharge of aerated slurry to a semi-circular vat. The ink-laden recycled fiber slurry enters one or more gas sparged hydrocyclones at pipe 11 at a pressure between 5–30 psi and a consistency between 0.5 and 3.0% B.D., preferably 1.0–2.0% B.D., and is distributed to one or more feed headers 12 which introduce slurry to the inlets of one or more gas sparged hydrocyclones 13. Header 12 may also be a ring header if more than two hydrocyclones 13 are used. A preferred hydrocyclone 13 is one sold by Kamyr, Inc. of Glens Falls, N.Y. under the trademark GSC®. Though a single feed line 11 is shown feeding two hydrocyclones 13, the system may include a plurality of feed lines 11 connected to a plurality of hydrocyclones 13.

Figure 3:
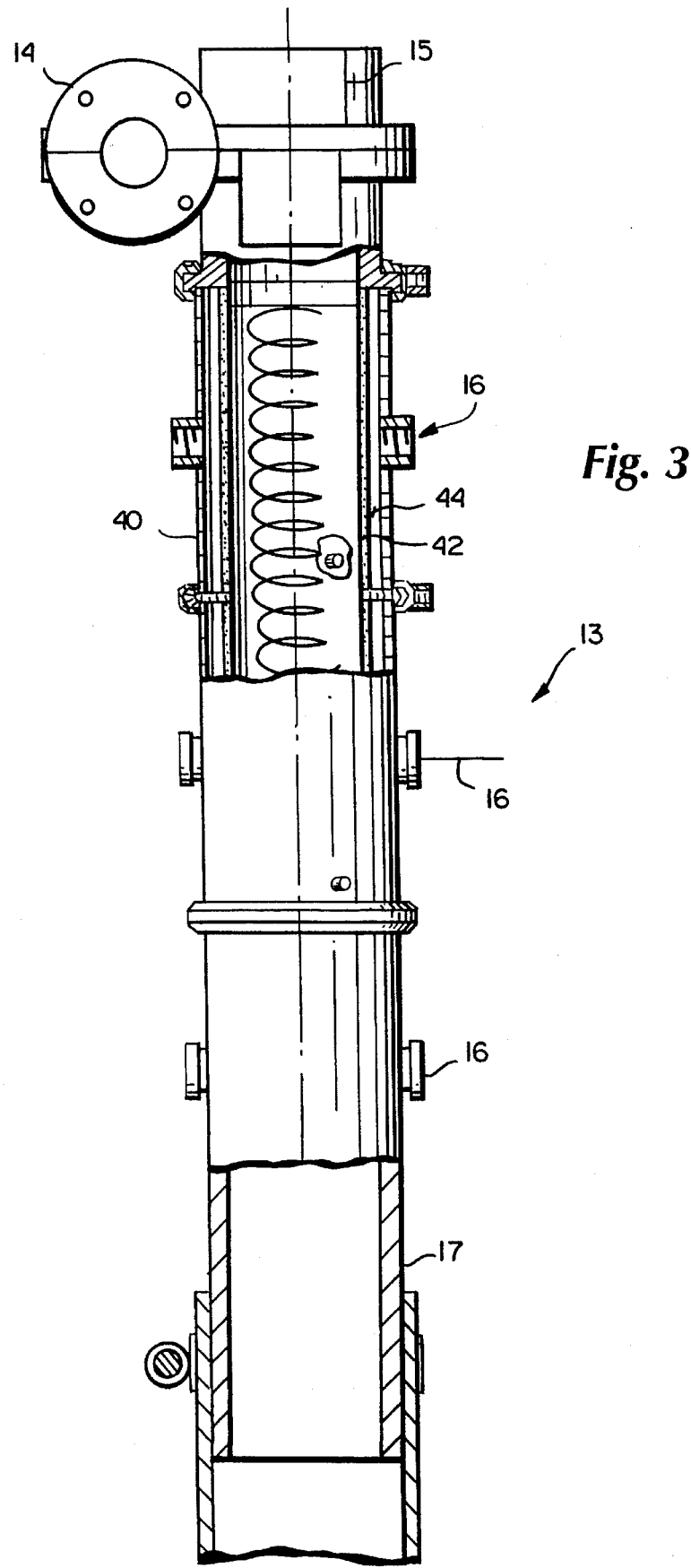
FIG. 3 is a side view, partly in cross-section and partly in elevation, of an exemplary gas sparged hydrocyclone that is utilized in the system of FIGS. 1 and 2.

As seen in FIGS. 1–3, each hydrocyclone 13 has an inlet 14, a rejects outlet 15, one or more gas introduction inlets 16 (which introduce gas through porous cylinders, as in U.S. Pat. No. 5,131,980), and an accepts outlet 17. The ink-laden rejects pass from outlet 15 to a rejects tank 25. The outlets 17, are connected to an accepts header 18 which is located within an elongated vat (separation vessel) 19 of semi-circular cross-section.

The accepts header, 18, contains a series of orifices 18' (see FIG. 1), or a single adjustable slot, which discharge the aerated slurry in a horizontal or slightly downward direction so that the slurry impinges the curved inside bottom wall of the vat 19. The slurry produces a liquid level, 20, within the vat, 19. The momentum of the slurry exiting the accept header 18 causes the slurry to follow a path along the inside surface of the vat and then across the surface of the liquid level, 20, as shown approximately by arrow 21.

While flowing in the direction of arrow 21, the air bubbles with the attached ink particles or contaminants rise to the surface of the slurry, 20, to form an ink and contaminant-laden foam, 22. The horizontal momentum of the slurry movement forces the accumulated foam to flow over a weir, 23, into a rejects vat 24. This discharge of foam, 22, may be aided by a mechanical discharge or skimmer such as shown by paddle wheel 26, rotatable about a horizontal axis. The wheel 26 and weir 23 comprise components of a foam removing means.

The de-inked fiber continues to flow in the direction of arrow 27 under the momentum produced by the slurry flow. The de-inked fiber is discharged from the bottom of vat 19 through an accepts outlet slot 28 which discharges de-inked fiber slurry to an accepts tank 29. The accepts tank, 29, is hydraulically full and the level of slurry in this tank is controlled so that the level 20 in the vat 19 is controlled. The flow of de-inked slurry may be prevented from exiting the vat 19 directly by locating a baffle plate 30 above the accepts outlet 28. The slot, 28, and baffle, 30, extend across the width of vat 19 and may be adjustable so that the optimum slot width and baffle plate angle and width can be obtained depending upon the process conditions.

The baffle plate, 30, may be oriented at an angle, $\alpha$, between 0° and 45° below the horizontal, preferably between 20° and 40°. For example, the angle $\alpha$ in FIG. 1 is approximately 30°.

Also, the location of the accepts slot relative to the centerline 31 of the vat 19, this, angle $\theta$, may range from 0° to 80°, preferably, about 20° to about 50°. For example, the angle $\theta$ shown in FIG. 1 is approximately 35°. The discharge from the accepts header 18, opening 18', is directed away from the outlet slot to minimize "short-circuiting" of flow from the inlet to the outlet.

The de-inked fiber slurry, that is, the "accepts", is removed from tank 29 through conduit 32. The accepts may proceed to a downstream process, for example, screening, bleaching, or thickening, or may be directed to another de-inking stage similar to the one described above. The ink-laden rejects may be discharged or sent to a second de-inking stage, or to a rejects recovery process to recover usable fiber that may have been included with the rejects.

This gas sparged hydrocyclone aeration and flotation vessel method allows contaminants to be quickly removed from the flotation vessel avoiding collapse and re-entrainment of contaminants into the de-inked fiber slurry.

The gas sparged hydrocyclone reject flow from outlet 15 may be varied from 0% (i.e., no rejects flow) to 5–25%, typically about 8–12%, depending upon process conditions. This percentage is the fraction of total flow entering the system through conduit 11. The air-to-slurry ratio of the air volume introduced via inlet 16 may range from 0.1–1.0 to 1, preferably, 0.2–0.7 to 1, most preferably, 0.3–0.4 to 1.

In addition, additives may be added to the incoming slurry to aid in de-inking, such as displectors. [A "displector" is a chemical additive that makes ink and contaminants more hydrophobic so that they will more readily attach to air bubbles.]

A cross-section of the gas sparged hydrocyclone shown in item 13 in FIGS. 1 and 2 is shown in FIG. 3. The hydrocyclone is similar to the hydrocyclones described in U.S. Pat. Nos. 5,069,751 and 5,131,980 but may or may not include an orifice, restriction, or "pedestal" at the outlet 17. This hydrocyclone 13 functions primarily as a "contactor" instead of a "de-inker" although some de-inking may be performed. A hydrocyclon/contactor 13 has a tangential slurry inlet 14 at a first end thereof, and an outer solid wall tube 40 having an axis of elongation, and an inner gas porous wall tube 42 within the outer wall tube, with a gas space 44 between the walls 40, 42. Gas is introduced into the gas space 44 by one or more gas introduction inlets 16. In FIG. 3 the slurry outlet 17, at the opposite end of the contactor 13 from the inlet 14, is shown free of a restriction, orifice, or pedestal. The flow of aerated slurry, if not restricted by a physical obstruction, may be restricted by back-pressure from the downstream device. For example, the liquid level 20 in a downstream flotation vessel 19 can be varied to vary the back pressure in the cyclone 13 and thus vary the aerated slurry flow out of the cyclone 13. By varying the slurry flow out of the outlet, 17, the flow out of the rejects outlet, 15, is also varied and controlled. This mode of operation is particularly effective in diverting extremely dirty furnish out of the rejects outlet by raising the level 20 in the flotation vessel 19.

Figure 4:
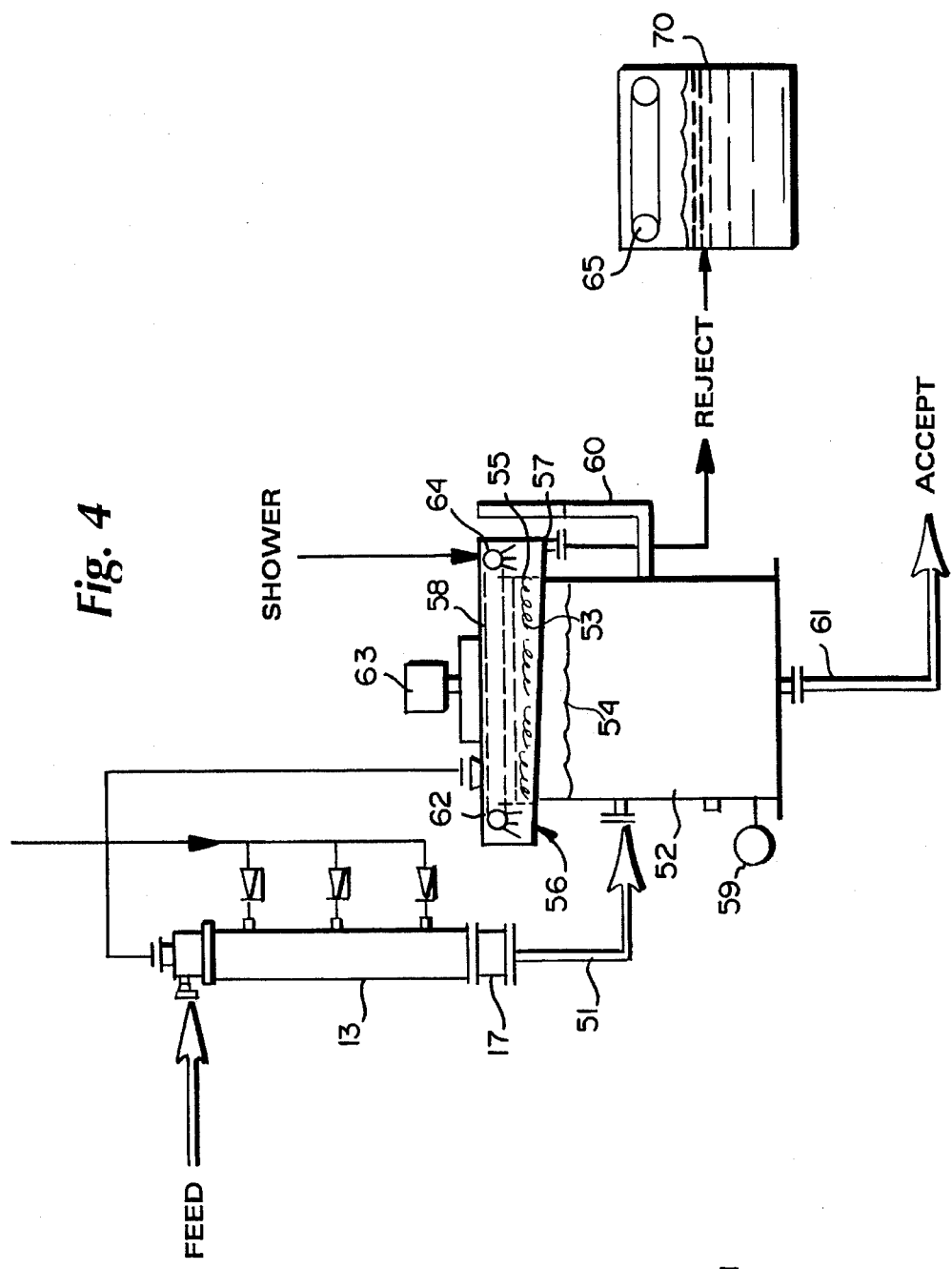
FIG. 4 is a view like that of FIG. 1 for a second embodiment of the system according to the present invention and FIG. 5 is a view like that of FIG. 4 only with just the flotation vessel of the system;.

FIG. 4 shows a second preferred embodiment of the present invention. The feed system and hydrocyclone aeration are identical to what is shown in FIGS. 1 and 2 (i.e., items 11–17 apply to FIG. 4 also). In FIG. 4, the hydrocyclone accepts outlet, 17, feeds conduit 51 which discharges to upright cylindrical flotation vessel 52. Typical vessel 52 diameters may range from 2 to 15 feet. The inlet pipes 51 enter the vessel at a height approximate ⅔ the height of the vessel. The entry of aerated fiber slurry into vessel 52 may be tangential, and may be directed downward at a slight angle, so that a vortex flow is created within the vessel 52. However, depending upon process conditions, vortex flow may not be preferred and may be mininimized by placing "vortex breakers" within the vessel 52. These vortex breakers may comprise one or more stationary vertical plates which minimize vortex movement of the slurry. Though only one hydrocyclone 13 appears in FIG. 4, the vessel may be fed by a plurality of hydrocyclones 13.

After entering the vessel 52, contaminant-laden air bubbles rise in the vessel 52 to form a level of foam 53 above the liquid slurry level 54. The liquid level, 54, is maintained at least six inches above the inlet 52 to minimize the re-entrainment of ink into the slurry. The foam layer is typically 10–12 inches thick. The ink-laden foam flows over a weir 55 into a rejects trough 56; the trough 56 may be inclined as shown. The trough 56 discharges into a rejects outlet 57. The flow of foam over the weir, 55, may be aided by a mechanical agitator, 58, such as a scraper or foam breaker driven by a motor, 63, comprising (with weir 55) foam removing means. The trough 56 may have a cover, 62, and vent.

Also, the outside wall of the weir, 55, and the wetted surfaces of the trough, 56, may be treated with a material that will reduce the surface tension between the bubbles and the wetted surfaces. For example, these surfaces may be coated with polytetrafluoroethylene (PTFE), or other similar substances. Reducing the surface tension between the bubbles and the vessel walls decreases the stability of the bubbles and promotes bubble collapse.

The rejects outlet, 57, may feed a rejects tank 70 (like tanks 24, 25 in FIG. 1), a fiber recovery system, or a second de-inking stage. (The rejects from the hydrocyclone 13 may also be sent to the rejects tank 70.) The volume of foam collected and further generated in the rejects tank 70 may be reduced in several ways. For example, the top of the rejects tank may include a circular shower header 65 which sprays water onto the foam, to break up the foam. (Defoamer may be added to the shower 65 water.)

The de-inked fiber slurry is removed from the bottom of the vessel via outlet 61. The accepts may be sent to a downstream process, stored, or treated in another similar hydrocyclone-column de-inking process. A manometer 60 may also be utilized.

The liquid slurry level 54 in the vessel 52 may be monitored by a level indicator such as a pressure gauge 59, U-tube 60, or pressure differential indicators (not shown). This level may be controlled by regulating a valve (not shown) on the accepts discharge, 61, or at the discharge side of an accepts pump.

Figure 5:
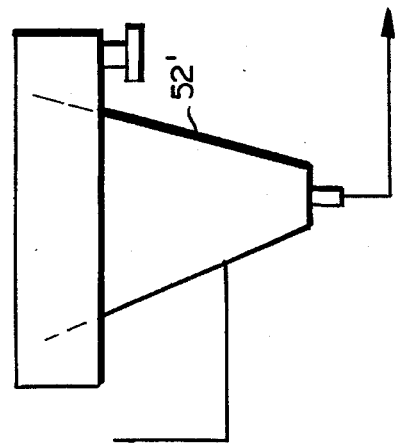

FIG. 5 illustrates an alternate embodiment to FIG. 4 in which comparable components are shown by the same reference numeral followed by a "'". The vessel 52' is tapered having a larger diameter at the top than at the bottom. This tapered vessel 52' provides a larger surface area for foam generation at the top of the vessel 52'. A larger surface area decreases the resulting foam layer thickness which reduces the potential for foam collapse. A tapered vessel 52' also reduces a restriction of the upward flow of bubbles. A stepped vessel is a special case of a "tapered" vessel, as set forth in the specification and claims, and may also be used instead of a taper.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A deinking system for deinking a cellulose fiber slurry containing ink particles, said system comprising:

a source of cellulose fiber slurry containing ink particles;

a contactor for contacting cellulose fiber slurry with gas, comprising: an outer solid wall tube having an axis of elongation, and an inner gas porous wall tube within said outer wall tube, with a gas space between said inner and outer walls; a first end of said outer tube having a tangential inlet for cellulose fiber slurry containing ink particles, to swirl within said inner wall tube; a second end of said outer tube having an axial slurry outlet free of a restriction, orifice or pedestal; and one or more gas introduction inlets for introducing gas into said gas space between said inner and outer walls to pass through said porous inner tube into the swirling slurry;

a foam separating vessel having a liquid level therein, a top, and a bottom;

a conduit exterior of said vessel and connecting said contactor slurry outlet to said foam separating vessel and having a discharge opening below the liquid level in said foam separating vessel, a cellulose fiber slurry accepts outlet from said foam separating vessel bottom; and.

means for removing foam formed above the liquid level, with ink particles and contaminants therein, from said foam separating vessel.

2. A deinking system as recited in claim 1 wherein said foam removing means comprises a weir.

3. A deinking system as recited in claim 1 further comprising a liquid shower at the top of said foam separating vessel to break up foam bubbles.

4. A deinking system as recited in claim 3 further comprising a plurality of said contactors each having a said conduit connected thereto, said all of said conduits connected to said foam separating vessel.

5. A deinking system as recited in claim 1 wherein said foam separating vessel is substantially cylindrical.

6. A deinking system as recited in claim 5 wherein said foam separating vessel has a diameter of between 2–15 feet.

7. A deinking system as recited in claim 5 further comprising a rejects trough for receiving rejects from said foam removing means.

8. A deinking system as recited in claim 7 wherein said foam removing means comprises a weir and a mechanical agitator, said trough receiving rejects flowing over said weir.

9. A deinking system as recited in claim 8 further comprising a cover over said trough with a vent therein.

10. A deinking system as recited in claim 8 wherein said weir has an exterior surface, closest to said trough, and wherein said trough has wetted surfaces; and wherein said exterior surface of said weir and said wetted surfaces of said trough are treated with a material that reduces surface tension between foam bubbles and said surfaces.

11. A deinking system as recited in claim 8 further comprising a liquid shower at the top of said foam separating vessel to break up foam bubbles.

12. A deinking system as recited in claim 8 further comprising a plurality of said contactors each having a said conduit connected thereto, said all of said conduits connected to said foam separating vessel.

13. A deinking system as recited in claim 1 wherein said foam separating vessel is tapered so that it has a larger cross-sectional area at the top thereof than at the bottom thereof.

14. A deinking system as recited in claim 1 wherein said foam removing means comprises a mechanical discharge or skimmer.

15. A deinking system as recited in claim 14 wherein said mechanical discharge or skimmer comprises a paddle wheel.

16. A deinking system as recited in claim 15 wherein said foam removing means further comprises a weir.

17. A deinking system as recited in claim 14 wherein said foam removing means further comprises a weir.

18. A deinking system as recited in claim 17 further comprising a liquid shower at the top of said separating vessel to break up foam bubbles.

19. A deinking system as recited in claim 1 wherein said foam separating vessel has a curved bottom, an accepts outlet in said curved bottom; and wherein said conduit is connected to said foam separating vessel so as to introduce slurry into said foam separating vessel in a direction away from said accepts outlet so that the slurry flows in part along the curved bottom and up toward a top surface of the liquid level therein.

20. A deinking system as recited in claim 1 further comprising a plurality of said contactors each having a said conduit connected thereto, said all of said conduits connected to said foam separating vessel.

* * * * *